United States Patent
Tanaka

(10) Patent No.: US 7,436,358 B2
(45) Date of Patent: Oct. 14, 2008

(54) SIGNAL ARRIVAL DIRECTION DEDUCING DEVICE, SIGNAL ARRIVAL DIRECTION DEDUCING METHOD, AND SIGNAL DIRECTION DEDUCING PROGRAM

(75) Inventor: Akira Tanaka, Sapporo (JP)

(73) Assignee: National University Corporation Hokkaido University, Sapporo-shi, Hokkaido (JP)

( * ) Notice: Subject to any disclaimer, the term of this patent is extended or adjusted under 35 U.S.C. 154(b) by 0 days.

(21) Appl. No.: 11/662,654

(22) PCT Filed: Sep. 14, 2005

(86) PCT No.: PCT/JP2005/016956

§ 371 (c)(1), (2), (4) Date: Mar. 13, 2007

(87) PCT Pub. No.: WO2006/030834

PCT Pub. Date: Mar. 23, 2006

(65) Prior Publication Data

US 2008/0001821 A1 Jan. 3, 2008

(30) Foreign Application Priority Data

Sep. 14, 2004 (JP) .............................. 2004-267380

(51) Int. Cl.
- G01S 5/02 (2006.01)
- G01S 5/04 (2006.01)
- H04B 7/10 (2006.01)
- H04L 25/08 (2006.01)

(52) U.S. Cl. .................. 342/417; 342/445; 375/346; 375/347

(58) Field of Classification Search .............. 342/147, 342/417, 416

See application file for complete search history.

(56) References Cited

U.S. PATENT DOCUMENTS

| 4,118,665 A | * | 10/1978 | Reinhardt | 324/617 |
| 6,351,238 B1 | * | 2/2002 | Kishigami et al. | 342/445 |
| 6,567,034 B1 | * | 5/2003 | Yu | 342/16 |
| 7,133,699 B1 | * | 11/2006 | Owechko et al. | 455/562.1 |
| 2002/0002455 A1 | * | 1/2002 | Accardi et al. | 704/226 |
| 2002/0126778 A1 | * | 9/2002 | Ojard et al. | 375/346 |
| 2003/0182618 A1 | * | 9/2003 | Chen et al. | 714/794 |
| 2003/0228017 A1 | * | 12/2003 | Beadle et al. | 380/270 |
| 2004/0012525 A1 | * | 1/2004 | Yuda et al. | 342/417 |
| 2004/0189523 A1 | * | 9/2004 | Kishigami et al. | 342/417 |
| 2005/0276361 A1 | * | 12/2005 | Kim et al. | 375/347 |

FOREIGN PATENT DOCUMENTS

JP 11-133130 5/1999

* cited by examiner

Primary Examiner—Thomas H. Tarcza
Assistant Examiner—Harry Liu
(74) Attorney, Agent, or Firm—The Nath Law Group; Jerald L. Meyer; Derek Richmond

(57) ABSTRACT

A signal arrival direction deducing device capable of deducing the signal arrival direction even when a correlation matrix between input signals and noise correlation matrix are singular. A state is observed in which only noise is present and a state is observed in which a sound whose arrival direction is to be deduced. A short time Fourier transform is performed. Correlation matrix and an input signal correlation matrix are used to compute proper eigenvalues/proper eigenvectors and improper eigenvectors of the noise correlation matrix with respect to the input signal correlation matrix. A matrix for determining the complementary space component of the signal partial space is computed from the proper eigenvectors and the improper eigenvectors. An arrival direction search is made for the sound arrival direction using the matrix for determining the complementary space component of the signal partial space.

6 Claims, 1 Drawing Sheet

SIGNAL ARRIVAL DIRECTION DEDUCING DEVICE, SIGNAL ARRIVAL DIRECTION DEDUCING METHOD, AND SIGNAL DIRECTION DEDUCING PROGRAM

TECHNICAL FIELD

The present invention relates to a signal arrival direction estimating apparatus, signal arrival direction estimating method and signal arrival direction estimating program, for estimating the direction of arrival of signals such as radio waves and sound.

BACKGROUND ART

MUSIC (Multiple Signal Classification) method, ESPRIT (Estimation of Signal Parameters via Rotational Invariance Technique) method or the like are well known as conventional signal arrival direction estimating schemes.

The MUSIC method is an algorithm that estimates the directions of a plurality of radio signals which arrive at an array antenna, etc. at the same time, and in this method, the parameters of incoming signals are estimated using components of noise that has no relationship with the incoming signal. In estimating the arrival direction of the radio waves using the MUSIC method, eigenvalue s of a correlation matrix obtained from the received signals are determined and the determined eigenvalues are divided into signal eigenvalues and noise eigenvalues according to the number of incoming waves, and, a noise eigenvectors corresponding to the noise eigenvalues are determined, an angle spectrum is determined from the noise eigenvectors thus obtained, and, by averaging these out by the angle (in other words, the frequency) to determine a MUSIC spectrum, the arrival direction of the incoming signal is estimated. Also, the basic principle of the ESPRIT method is the same as that of the MUSIC method. However, with this technique, by arranging a plurality of pairs of arrays having parallel array surfaces, the geometric information and amount of calculations of the arrays, which are required in the MUSIC method, are reduced.

Techniques such as those described in Patent Document 1, Patent Document 2 and Patent Document 3, for instance, are proposed as improved schemes of these methods.

The technique described in Patent Document 1 realizes arrival direction estimation with a reduced amount of calculations, by using an inverse matrix of the input signal correlation matrix, instead of using eigen value decomposition. Also, the technique described in Patent Document 2 realizes a reduction in the amount of calculations by configuring a Toeplitz matrix only from the correlation vectors of a first receiver and another receiver and using this instead of the input signal correlation matrix. Also, the technique described in Patent Document 3 realizes arrival direction estimation, even when a signal source having a frequency that was not predicted at the time of deciding the array interval is present, by causing physically rotating the arrays. All of these technologies realize a reduction of the amount of calculations and improvement of performance, based on the assumption that the input signal correlation matrix is "non-singular" (i.e. it has an inverse matrix).

Patent Document 1: Japanese Patent Application Laid-Open No.2002-148324
Patent Document 2: Japanese Patent Application Laid-Open No.Hei11-133130
Patent Document 3: Japanese Patent Application Laid-Open No.2001-108734

DISCLOSURE OF INVENTION

Problems to be Solved by the Invention

However, the signal arrival direction estimating schemes described in Patent Documents 1 to 3 have the problem that, since it is assumed that the input signal correlation matrix is non-singular, when, for instance, fewer noise sources are present in the measuring space than the number of microphones, if the input signal correlation matrix or the noise correlation matrix is singular" (i.e. it does not have an inverse matrix), these schemes cannot be applied. In the case of simply using the eigenvalue decomposition of the input signal correlation matrix, without using information pertaining to noise, it may be impossible to decide whether the thus-obtained eigenvalues derives from noise or from the signal. In addition, in the case of attempting to use the input signal correlation matrix and the noise correlation matrix, since it is necessary to use, in principle, the inverse matrix of the noise correlation matrix, if the noise correlation matrix is singular, the above-mentioned inverse matrix does not exist in the first place, and, in other words, calculation thereof is impossible.

It is therefore an object of the present invention to provide a signal arrival direction estimating apparatus, a signal arrival direction estimating method and a signal arrival direction estimating program capable of estimating a signal arrival direction even when an input signal correlation matrix and a noise correlation matrix are singular.

Means for Solving the Problem

In accordance with one aspect of the present invention, a configuration is employed that calculates a noise correlation matrix in a situation where there is no signal whose direction of arrival is a target of estimation and where there is only noise, and an input signal correlation matrix in a situation where there are both a signal whose direction of arrival is a target of estimation and noise, that calculates proper eigenvalues, proper eigenvectors and improper eigenvectors of the noise correlation matrix with respect to the input signal correlation matrix, using the noise correlation matrix and the input signal correlation matrix, and that estimates the direction of arrival of the signal based on the proper eigenvalues, the proper eigenvectors and the improper eigenvectors.

Advantageous Effect of the Invention

According to the present invention, the proper eigenvalues, the proper eigenvectors and the improper eigenvectors of the noise correlation matrix with respect to the input signal correlation matrix are determined, and the arrival direction of the signal is estimated based on these proper eigenvalues, proper eigenvectors and improper eigenvectors, so that the signal arrival direction can be estimated even when the input signal correlation matrix and the noise correlation matrix are singular.

BEST MODE FOR CARRYING OUT THE INVENTION

Figure 1:
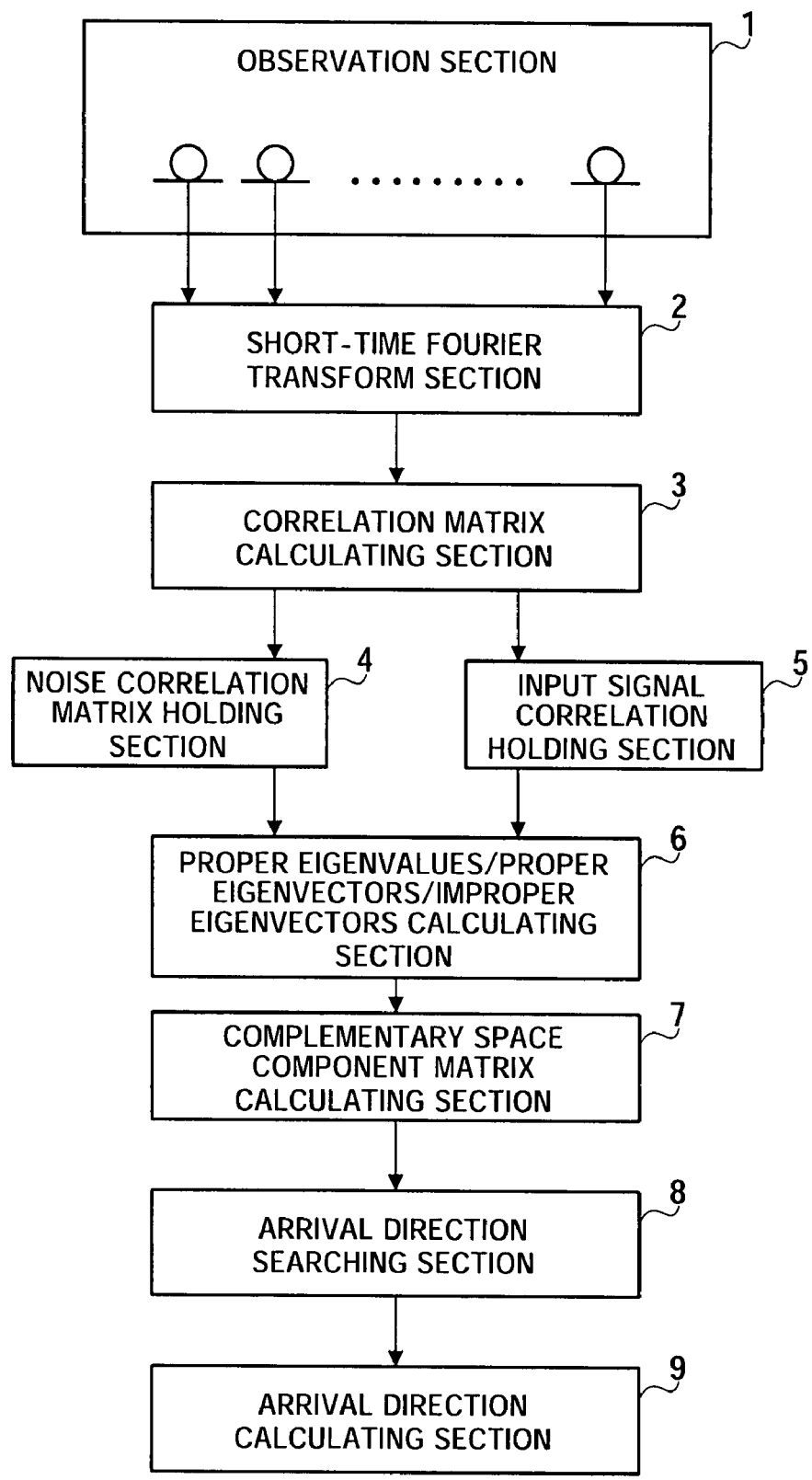
FIG. 1 is a block diagram showing a configuration of the signal arrival direction estimating apparatus according to one embodiment of the present invention.

Now, embodiments of the present invention will be described in detail with reference to the accompanying drawing. In the present embodiment, a description is given of an improved version of the MUSIC method, as a signal arrival direction estimating method.

Here, as described above, the MUSIC method refers to an algorithm for estimating the direction of a plurality of radio waves, etc. signals which arrive at an array antenna or the like, at the same time, and in this method, the parameters of incoming signals are estimated by using noise components which have no relationship to the incoming signals. As described above, in radio wave arrival direction estimating using the MUSIC method, for instance, the eigenvalues of the correlation matrix obtained from the received signal is determined, and the obtained eigenvalues are divided into signal eigenvalues and noise eigenvalues according to the number of incoming radio waves, and the noise eigenvectors corresponding to the noise eigenvalues are determined, the angle spectrum is determined from the noise eigenvectors which have been obtained, and, by averaging these out by the angle (in other words, the frequency) to determine a MUSIC spectrum, the arrival direction of the incoming signal is estimated.

In the present embodiment, in this MUSIC method, the noise correlation matrix and the input signal correlation matrix are determined, the proper eigenvalue s, the proper eigenvectors and the improper eigenvectors of the noise correlation matrix with respect to the input signal correlation matrix are calculated, then, the matrix for determining the complementary space components of the signal subspace is calculated, and the arrival direction of the signal is estimated based on the matrix which has been obtained.

First, the principle of the present invention will be described.

Here, when the matrix in which the transfer functions from the i-th signal source to the j-th receiver are aligned is "A," the space defined by the column vectors of this matrix A is the "signal subspace." The signal subspace is where a signal is present. When there is no noise, the signal subspace is the same as the space defined by the column vectors of the input signal correlation matrix, and matches the subspace defined by those vectors, among the eigenvectors of the input signal correlation matrix, corresponding to eigenvalues greater than 0. Intuitively, the signal subspace matches the linear subspace created by the weight vectors of the receiver array of when the directivity of the receiver array points towards the signal source. On the other hand, what in the existing schemes is referred to as the "noise subspace" is a complementary space of the signal subspace. The noise subspace is where there is only noise. For instance, when the target space is a two-dimensional space and the y axis is the signal subspace, one method of selecting the complementary space is to select the x axis.

Now, to simplify the description, if noise is uncorrelated, the two subspaces (the signal subspace and the noise subspace) are orthogonal to each other (like the y axis and the x axis).

In estimating the arrival direction, it is assumed that a weight vector is created which has directivity in a certain direction. If, then, this vector is pointed in the direction of the signal source, this vector becomes a vector on the signal subspace. This means that, in the above example, the vector is on the y axis. Accordingly, if this vector is orthogonally projected on the complementary space (that is, on the x axis), the vector becomes close to a zero vector. The MUSIC spectrum is the reciprocal of the square of the length of this vector, and, as a result, when the weight vector is pointed in the direction of the signal, the MUSIC spectrum takes an extremely large value. Thus, the basic concept of the MUSIC method is that the angle where the MUSIC spectrum takes a large value gives the arrival direction of the signal.

On the other hand, when noise is not uncorrelated, usually, the complementary space is not orthogonal to the signal subspace. For instance, the straight line of $y=-x$ gives the complementary space. However, even in this case, by specifying the accurate signal subspace (y axis) using information of the noise correlation matrix and making projection oblique with respect to the straight line $y=-x$, along the y axis, it is possible to discuss this case in the same way as in the case where the signal subspace and the complementary space are orthogonal. This is mathematically realized by a generalized eigenvalue decomposition of the input signal correlation matrix with respect to the noise correlation matrix. To be more specific, this is equivalent to cutting the space in a specific direction such that the y axis and $y=-x$ are orthogonal to each other and performing the same operation as when the y axis and $y=-x$ are orthogonal. Now, an extremely important point of the existing method is the assumption that the complementary space can be specified by the noise correlation matrix. More specifically, it is assumed that the noise correlation matrix has all the information regarding the complementary space. This corresponds to the case where the noise correlation matrix is non-singular. However, when the noise correlation matrix is singular, the generalized eigenvalue expansion of the input signal correlation matrix with respect to the noise correlation matrix cannot be calculated, because this calculation requires the inverse matrix of the noise correlation matrix.

The present invention focuses on the problem of the case where the complementary space ($y=-x$ in the above-described example) cannot be specified by the noise correlation matrix. To be more specific, this situation occurs when there are fewer noise sources than the receivers constituting the array. In this case, as described above, the generalized eigenvalue decomposition of the input signal correlation matrix with respect to the noise correlation matrix cannot be calculated. When this is the case, by uncritically assuming that the complementary space is orthogonal, the method of making orthogonal projection on the x axis may be possible. However, with this method, the vector which is uncritically projected on the x axis does not necessarily have the same length as the vector projected on the original complementary space, and, in addition, in the stage of specifying the signal subspace, there is no guarantee that an eigenvector corresponding to a large eigenvalue becomes the signal subspace. In other words, there is a possibility that the signal subspace cannot be accurately determined.

The cause of this problem is that no consideration is given to the case where the weight vector is pointed in a direction which is neither that of the signal nor the noise. Fundamentally, when the weight vector is pointed in such a direction, the MUSIC method does not work, unless assuming that the direction is also a complementary space. Here, the way to define the direction which is neither the signal nor noise would be to define a subspace which is neither the subspace defined by the input signal correlation matrix nor the subspace defined by the noise correlation matrix. This is mathematically described as the "improper eigenvector" of the noise correlation matrix with respect to the input signal correlation matrix. Accordingly, of the subspace defined by the input signal correlation matrix, by using the portion deriving from noise (the space which is called the "noise subspace" in the existing method) and the subspace defined by the improper eigenvectors as the complementary space, an accurate "complementary space of the signal subspace" is obtained, and, by projecting the weight vector onto the above-mentioned complementary space, it is possible to obtain an accurate MUSIC spectrum.

To consider a mathematical definition, when, for instance, A is a Hermitian matrix, B is a positive semi-definite Hermitian matrix, and scalar $\lambda$ and vector w satisfy $Aw=\lambda Bw$, $Bw \neq 0$, $\lambda$ and w are called the proper eigenvalue and the proper eigenvector of A with respect to B. Also, when $Aw=Bw=0$, w is called the improper eigenvector.

In short, the essence of the MUSIC method is to adequately estimate the "space other than the signal subspace," and, since theory provides that in the most simple case (that is, when there are uncorrelated noises) the signal subspace and the noise subspace are orthogonal to each other, these spaces can be specified by the eigenvalue decomposition of the signal correlation matrix. When the signal subspace and the noise subspace are not orthogonal to each other, an operation is added to nullify the correlation of the noise, which results in the same problem as when they are orthogonal. This is mathematically realized by the generalized eigenvalue decomposition of the signal correlation matrix with respect to the noise correlation matrix. In whichever case, the existing method assumes that spaces that are not the signal subspace are all noise subspaces (this corresponds to the condition that the noise correlation matrix is non-singular), the "space other than the signal subspace" is called the noise subspace. However, generally, it may be possible that the "noise subspace" and the "subspace which is neither the signal nor the noise" are present in the "space other than the signal subspace" (this corresponds to the case that the noise correlation matrix is singular. That the noise correlation matrix is non-singular is an extremely limited condition). With the existing scheme, it is impossible to accurately identify these two. On the other hand, within the framework of the present invention, it is possible to represent the "subspace which is neither the signal nor the noise" by the improper eigenvectors, thereby providing a general framework which encompasses all problems including the case where the noise correlation matrix is non-singular. When the noise correlation matrix is non-singular, the improper eigenvectors are lost in the framework of the present invention. As a result, this becomes the same as the generalized eigenvalue decomposition of the signal correlation matrix with respect to the noise correlation matrix.

FIG. 1 is a block diagram showing a configuration of the signal arrival direction estimating apparatus according to an embodiment of the present invention.

The signal arrival direction estimating apparatus shown in FIG. 1 has observation section 1, short-time Fourier transform section 2, correlation matrix calculating section 3, noise correlation matrix holding section 4, input signal correlation matrix holding section 5, proper eigenvalues/proper eigenvectors/improper eigenvectors calculating section 6, complementary space component matrix calculating section 7, arrival direction searching section 8, and arrival direction output section 9.

Observation section 1 observes the input signal, such as target sound for arrival direction estimation, by a plurality of microphones or the like.

Short-time Fourier transform section 2 carries out a short-time Fourier transform on the input signal such as sound observed by observation section 1.

Correlation matrix calculating section 3 calculates a correlation matrix from the sequence obtained by the short time Fourier transform carried out by short-time Fourier transform section 2.

Noise correlation matrix holding section 4 holds a correlation matrix (noise correlation matrix) calculated by correlation matrix calculating section 3 in a noise-only environment.

Input signal correlation matrix holding section 5 holds a correlation matrix (input signal correlation matrix) calculated by correlation matrix calculating section 3, under the situation where a target sound for arrival direction estimation is present.

Proper eigenvalues/proper eigenvectors/improper eigenvectors calculating section 6 calculates proper eigenvalues, proper eigenvectors and improper eigenvectors of the noise correlation matrix with respect to the input signal correlation matrix, by the correlation matrices (noise correlation matrix, input signal correlation matrix) held respectively in noise correlation matrix holding section 4 and input signal correlation matrix holding section 5. A specific example of the calculation process will be described later.

Complementary space component matrix calculating section 7 calculates a matrix to be used to determine the complementary space components of the signal subspace, by the proper eigenvalues, the proper eigenvectors and the improper eigenvectors of the noise correlation matrix with respect to the input signal correlation matrix. A specific example of the calculation process will be described later.

Arrival direction searching section 8 searches the direction of arrival of the sound, by using the complementary space component matrix calculated by complementary space component matrix calculating section 7.

Arrival direction output section 9 outputs the direction of arrival of the sound obtained as a result of the search carried out by the arrival direction searching section 8.

In this example, an observation section for sound or the like is used as observation section 1. However, an observation section for observing radio waves or the like by an antenna or an observation section for other signals may also be used.

A signal arrival direction deducing device capable of deducing the signal arrival direction even when a correlation matrix between input signals and noise correlation matrix are singular. In the device, observing means 1 observes a state in which only noise is present and a state in which a sound whose arrival direction is to be deduced is inputted, short time Fourier transform means 2 performs short time Fourier transform, and correlation matrix computing means 3 computes a noise correlation matrix and an input signal correlation matrix. The correlation matrices obtained are held in noise correlation matrix holding means 4 and input signal correlation matrix holding means 5 respectively. Using these correlation matrices, proper eigenvalues/proper eigenvectors/improper eigenvectors computing means 6 computes the proper eigenvalues, the proper eigenvectors and the improper eigenvectors of the noise correlation matrix with respect to the input signal correlation matrix. Complementary space component matrix computing means 7 computes a matrix for determining the complementary space component of the signal partial space from the obtained proper eigenvalues, the proper eigenvectors, and the improper eigenvectors. Arrival direction searching means 8 searches for the sound arrival direction using the matrix for determining the complementary space component of the signal partial space.

Next, a description will be given on the operation of a sound arrival direction estimating apparatus according to the present embodiment having the above-described configuration.

First, for a preparatory stage, observation is carried out by observation section 1, in a situation where a target sound for arrival direction estimation is not present (in other words, in a situation where there is only noise), a short-time Fourier transform is performed by short-time transform section 2, a noise correlation matrix is calculated by correlation matrix calculating section 3, and held in noise correlation matrix holding section 4.

To be more specific, assuming that the frequency index is $\omega$, the time frame index is t, the number of observations is n, and the representation of each observation on which the short-time Fourier transform has been performed, by an n-dimensional vector is $x(\omega, t)$, then E is the expected value with respect to the time frame, "*" is a symbol that shows conjugate transposition, and the noise correlation matrix $Q(\omega)$ is shown by the following equation (1):

$$Q(\omega)=E[x(\omega,t)x(\omega,t)^*] \qquad \text{(Equation 1)}$$

The group of matrices of this noise correlation matrix $Q(\omega)$ is held in noise correlation matrix holding section 4.

Next, by the same operation as that described above, correlation matrix calculating section 3 calculates the input signal correlation matrix and makes input signal correlation matrix holding section 5 hold it, in an actual operating state (that is, in a situation where a target sound for arrival direction estimation and noise are inputted).

If the components that derive from noise and the target sound for arrival direction estimation are uncorrelated, the input signal correlation matrix Rx $(\omega)$ can be written as equation (2):

$$Rx(\omega)=E[x(\omega,t)x(\omega,t)^*]=R(\omega)+Q(\omega) \qquad \text{(Equation 2)}$$

Here, $R(\omega)$ is the correlation matrix of the components that derive from the target sound for arrival direction estimation alone (that is, the input signal alone). More specifically, if the components deriving from the noise and the target sound for arrival direction estimation are uncorrelated, the input signal correlation matrix Rx $(\omega)$ is the sum of the noise correlation matrix $Q(\omega)$ and the correlation matrix $R(\omega)$ deriving from the target sound for arrival direction estimation alone. Since the input signal correlation matrix Rx$(\omega)$ and the noise correlation matrix Q $(\omega)$ can be calculated from the data which has been actually observed, it is possible, for instance, to determine a correlation matrix $R(\omega)$ of the components deriving from the target sound for arrival direction estimation alone, by using the difference between the two matrices. The rank of matrix $R(\omega)$ is set to be r(w).

Next, proper eigenvalues/proper eigenvectors/improper eigenvectors calculating section 6 calculates the proper eigenvectors/improper eigenvectors of the noise correlation matrix $Q(\omega)$ with respect to the input signal correlation matrix Rx$(\omega)$, by these noise correlation matrix $Q(\omega)$ and input signal correlation matrix Rx $(\omega)$ held in the noise correlation matrix holding section 4 and input signal correlation matrix holding section 5. Next, a description will be given of this eigenvector calculating process. The operation described below applies in a similar manner to all $\omega$, and, therefore, in the following description, $\omega$ is omitted.

To be more specific, proper eigenvalues/proper eigenvectors/improper eigenvectors calculating section 6 calculates the non-singular matrix T which simultaneously diagonalizes the noise correlation matrix Q and the correlation matrix R deriving from the input signal alone, by cogradient transformation. As a result, the noise correlation matrix Q and the correlation matrix R that derives from the target sound for arrival direction estimation alone (that is, the input signal alone) can be written as in the following equation (3):

$$Q=(T^*)^{-1} I_{n,r} T^{-1}, R=(T^*)^{-1} \Lambda T^{-1} \qquad \text{(Equation 3)}$$

Here, $I_{n,r}$ shows a matrix in which only the first r component (s) from the diagonal components is 1 and all the rest are 0, and $\lambda$ is a diagonal matrix. The algorithm for determining T is described in Rao and Mitra's book entitled *Generalized Inverse of Matrices and Its Applications*, chapter 6 (Tokyo Tosho, Co., Ltd).

If the components which derive from the noise and the target sound for arrival direction estimation are uncorrelated, then, by using this T, since the correlation matrix Rx of the input signal including the noise is the sum of the noise correlation matrix Q and the input signal correlation matrix R which derives from the target sound for arrival direction estimation alone, as described in above equation (2), this matrix is as shown in the following equation (4):

$$Rx=(T^*)^{-1}(\Lambda+I_{n,r})T^{-1} \qquad \text{(Equation 4)}$$

Even when the noise correlation matrix Q and the input signal correlation matrix Rx are simultaneously diagonalized by cogradient transformation, since the same T is obtained, equation (4) can be obtained without determining the correlation matrix R which derives from the input signal alone.

From these results, it is understood that the noise correlation matrix Q and the correlation matrix Rx of the input signal including noise satisfy the following equation (5):

$$QT=RxT(\Lambda+I_{n,r})^+ I_{n,r} \qquad \text{(Equation 5)}$$

"+" is a symbol that shows that the matrix is a Moore-Penrose-type generalized inverse matrix.

Then, assuming that from amongst the diagonal components of the matrix $(\lambda+I_{n,r})^+$, the location with the value 0 is the $k_1$-th component, the column vector of the $k_1$-th column in the T matrix is the improper eigenvectors. This $(\lambda+I_{n,r})^+$ matrix is used to specify the improper eigenvectors. There may be a plurality of improper eigenvectors.

On the other hand, it is assumed that, from amongst the proper eigenvalues (that is, the values arranged as the diagonal components of the $(\lambda+I_{n,r})^+ I_{n,r}$ matrix), the location which includes a diagonal component other than the above-mentioned $k_1$-th component and which has the value 1 is the $k_2$-th component. This $(\lambda+I_{n,r})^+ I_{n,r}$ matrix is used to specify the proper eigenvectors. There may be a plurality of locations where the diagonal components of the $(\lambda+I_{n,r})^+ I_{n,r}$ matrix are 1.

In other words, the column vector of the $k_2$-th column of the T matrix corresponds to the proper eigenvector which defines the basis of the noise subspace, and other proper eigenvectors define the basis of the signal subspace, and there may be a plurality of bases of the noise subspace and a plurality of bases of the signal subspace.

For instance, assume that the diagonal components of $\lambda$ matrix are [1, 0, 4, 0] and the diagonal components of $I_{n,r}$ matrix are [1, 1, 0, 0].

In this case, the nondiagonal components of $(\lambda+I_{n,r})^+$ matrix become 0, theoretically, whereas the diagonal components of $(\lambda+I_{n,r})^+$ become [0.5, 1, 0.25, 0], and, from amongst the diagonal components of $(\lambda+I_{n,r})^+$, the location where the value is 0 is the fourth component, and so $k_1$=4. In other words, this means that the column vector of the fourth column in the T matrix corresponds to the improper eigenvector.

In contrast to this, since the diagonal components of the $(\lambda+I_{n,r})^+ \times I_{n,r}$ matrix become [0.5, 1, 0, 0], assuming that, from amongst the diagonal components other than the above-mentioned $k_1$-th component, the location where the value is 1 is the $k_2$-th component, $k_2=2$. In other words, the column vector of the second column in the T matrix corresponds to the proper eigenvector corresponding to the noise subspace.

Then, the column vectors of the remaining first column and third column of the T matrix correspond to proper eigenvectors corresponding to the signal subspace.

It appears, at a first glance, that the above $(\lambda+I_{n,r})^+$ matrix used to determine the improper eigenvectors may be employed to determine the proper eigenvectors corresponding to the noise subspace. However, when the 4 inside $\lambda$ is 1, it becomes impossible to judge whether the 1 derives from noise or from the signal. Therefore, to determine a proper eigenvector corresponding to the noise subspace, the use of the $(\lambda+I_{n,r})^+$ matrix is inappropriate.

In this way, proper eigenvalues/proper eigenvectors/improper eigenvectors calculating section 6 determines the proper eigenvalues, proper eigenvectors and improper eigenvectors of the noise correlation matrix $Q(\omega)$ with respect to the input signal correlation matrix $Rx(\omega)$ by the noise correlation matrix $Q(\omega)$ and input signal correlation matrix $Rx(\omega)$, and, at the same time, separates the proper eigenvectors based on its proper eigenvalue, to calculate the proper eigenvectors corresponding to the noise subspace which is the subspace that relies on noise alone, and the proper eigenvectors corresponding to the signal subspace which is the subspace that relies on the input signal.

Next, complementary space component matrix calculating section 7 makes the proper eigenvectors corresponding to the signal subspace as in the following equation (6), the proper eigenvectors corresponding to the noise subspace as in the following equation (7), and the improper eigenvectors as in the following equation (8), and configures and holds the following equation (9):

$$u_i^s, (i=1, \ldots, n_s) \quad \text{(Equation 6)}$$

$$u_i^N, (i=1, \ldots, n_N) \quad \text{(Equation 7)}$$

$$u_i^I, (i=1, \ldots, n_I) \quad \text{(Equation 8)}$$

$$W=[u_1^s, \ldots, u_{n_s}^s, u_1^N, \ldots, u_{n_N}^N, u_1^I, \ldots, u_{n_I}^I] \quad \text{(Equation 9)}$$

In addition, $n=n_s+n_N+n_I$.

Next, complementary space component matrix calculating section 7 calculates the adjoint matrix of the above W as in the following equation (10):

$$W^*=[v_1^s, \ldots, v_{n_s}^s, v_1^N, \ldots, v_{n_N}^N, v_1^I, \ldots, v_{n_I}^I]^* \quad \text{(Equation 10)}$$

Then, complementary space component matrix calculating section 7 calculates a matrix obtained by extracting the following equation (11) alone:

$$X=[v_1^N, \ldots, v_{n_N}^N, v_1^I, \ldots, v_{n_I}^I]^* \quad \text{(Equation 11)}$$

from the above equation (10), as a matrix for determining the complementary space components of the signal subspace.

Then, arrival direction searching section 8 searches the direction from which the sound arrives. To be more specific, the weight vector with respect to a microphone array, which has a length of 1 and which is determined at the arrival direction $\theta$ of the signal, is a $(\theta)$ and arrival direction searching section searches $\theta$ where the following equation (12) reaches the peak:

$$PM(\theta) = \frac{1}{\|Xa(\theta)\|^2} \quad \text{(Equation 12)}$$

Finally, arrival direction output section 9 outputs the $\theta$ at the time PM ($\theta$) searched by arrival direction searching section 8 reaches the peak, as the arrival direction of the input signal.

The PM ($\theta$) in arrival direction searching section 8 is a mere example, and it may take any form, as long as arrival direction searching section 8 can uniquely determine arrival direction $\theta$ of the signal by X, that is, as long as arrival direction searching section 8 can uniquely determine the arrival direction $\theta$ using the proper eigenvectors corresponding to the signal subspace, the proper eigenvectors corresponding to the noise subspace and the improper eigenvectors.

In this way, according to the present embodiment, the proper eigenvalues, the proper eigenvectors and the improper eigenvectors of the noise correlation matrix with respect to the input signal correlation matrix are determined, the matrix for determining the complementary space components of the signal subspace is calculated based on these proper eigenvalues, proper eigenvectors and improper eigenvectors, and the arrival direction of the signal is estimated based on this matrix, so that it is possible to estimate the arrival direction of the signal even when the input signal correlation matrix and the noise correlation matrix are singular.

In the present embodiment, the configuration of the signal arrival direction estimating apparatus is shown by a block diagram and is described as hardware, as shown in FIG. 1. However, the present invention is not limited to this, and this signal arrival direction estimating apparatus may very well be implemented in software by an all-purpose computer such as personal computer (PC) or the like which has a CPU, a hard disk which stores a program which causes the CPU to run as described above, and a storage apparatus such as a memory or the like. In this case, the program which functions as the above-mentioned signal arrival direction estimating apparatus is recorded on a recording medium such as a CD or the like, is read out from this recording medium and installed on the storage apparatus inside the computer, or is downloaded from the server, or the like via a network such as the internet and is stored in the storage apparatus. In this way, even an all-purpose computer such as a PC or the like can execute the above described signal arrival direction estimating by executing a program which functions as the above-described signal arrival direction estimating apparatus.

The present application is based on Japanese Patent Application No. 2004-267380, filed on Sep. 14, 2004, the entire content of which is expressly incorporated by reference herein.

INDUSTRIAL APPLICABILITY

The signal arrival direction estimating apparatus, signal arrival direction estimating method and signal arrival direction estimating program according to the present invention provide an advantage of enabling estimation of the direction of arrival of a signal even when the correlation matrices are singular, by using the proper eigenvalues, proper eigenvectors and improper eigenvectors of the noise correlation matrix with respect to the input signal correlation matrix, which is a situation which formerly could not be dealt with by the conventional method. Consequently, the signal arrival direction estimating apparatus, signal arrival direction estimating method and signal arrival direction estimating program according to the present invention are suitable for use in a signal arrival direction estimating apparatus, signal arrival direction estimating method and signal arrival direction estimating program for estimating the direction of arrival of radio waves in mobile communications or indoor radio communications (for instance, wireless LAN) employing the MUSIC method.

The invention claimed is:

1. A signal arrival direction estimating apparatus that estimates a direction of arrival of a signal, the apparatus comprising:
   a correlation matrix calculating section that calculates a noise correlation matrix in a situation where there is no signal whose direction of arrival is a target of estimation and where there is only noise, and an input signal correlation matrix in a situation where there are both a signal whose direction of arrival is a target of estimation and noise;
   a proper eigenvalue/proper eigenvector/improper eigenvector calculating section that calculates a proper eigenvalue, proper eigenvector and improper eigenvector of the noise correlation matrix with respect to the input signal correlation matrix, using the noise correlation matrix and the input signal correlation matrix;
   an arrival direction estimating section that estimates the direction of arrival of the signal based on the proper eigenvalue, the proper eigenvector and the improper eigenvector; and
   a section for, in the case of the signal subspace not orthogonal to the noise subspace, nullifying the correlation of the noise.

2. The signal arrival direction estimating apparatus according to claim 1,
   wherein the proper eigenvalue/proper eigenvector/improper eigenvector calculating section calculates a proper eigenvector that corresponds to the signal subspace and a proper eigenvector that corresponds to the noise subspace, from the proper eigenvector, based on the proper eigenvalue,
   wherein the signal arrival direction estimating apparatus further comprises a complementary space component matrix calculating section that calculates a matrix for determining a complementary space component of the signal sub space, using the improper eigenvector, the proper eigenvector that corresponds to the signal subspace and the proper eigenvector that corresponds to the noise subspace, and
   wherein the arrival direction estimating section estimates the direction of arrival of the signal using the matrix for determining the complementary space component of the signal subspace, based on the proper eigenvalue, the proper eigenvector and the improper eigenvector.

3. The signal arrival direction estimating apparatus according to claim 2, wherein the matrix for determining the complementary space of the signal subspace is used instead of a matrix comprised of base of a noise subspace in a MUSIC (Multiple Signal Classification) method.

4. The signal arrival direction estimating apparatus according to claim 1, wherein the signal whose direction of arrival is the target for estimation includes a radio wave or sound.

5. A signal arrival direction estimating method for estimating a direction of arrival of a signal, the method comprising the steps of:
   calculating a noise correlation matrix in a situation where there is no signal whose direction of arrival is a target of estimation and where there is only noise, and an input signal correlation matrix in a situation where there are both a signal whose direction of arrival is a target of estimation and noise;
   calculating a proper eigenvalue, proper eigenvector and improper eigenvector of the noise correlation matrix with respect to the input signal correlation matrix, using the noise correlation matrix and the input signal correlation matrix;
   estimating the direction of arrival of the signal based on the proper eigenvalue, the proper eigenvector and the improper eigenvector; and
   in the case of the signal subspace not orthogonal to the noise subspace, nullifying the correlation of the noise.

6. A signal arrival direction estimating program for estimating a direction of arrival of a signal, the program implementing on a computer the steps of:
   calculating a noise correlation matrix in a situation where there is no signal whose direction of arrival is a target of estimation and where there is only noise, and an input signal correlation matrix in a situation where there are both a signal whose direction of arrival is a target of estimation and noise;
   calculating a proper eigenvalue, proper eigenvector and improper eigenvector of the noise correlation matrix with respect to the input signal correlation matrix, using the noise correlation matrix and the input signal correlation matrix;
   estimating the direction of arrival of the signal based on the proper eigenvalue, the proper eigenvector and the improper eigenvector; and
   in the case of the signal subspace not orthogonal to the noise subspace, nullifying the correlation of the noise.

* * * * *